United States Patent [19]
Kohzai et al.

[11] 4,342,950
[45] Aug. 3, 1982

[54] SPINDLE ROTATION CONTROL SYSTEM

[75] Inventors: Yoshinori Kohzai; Yoshiki Fujioka; Naoto Ota, all of Hino, Japan

[73] Assignee: Fujitsu Fanuc Limited, Tokyo, Japan

[21] Appl. No.: 190,661

[22] Filed: Sep. 25, 1980

[30] Foreign Application Priority Data

Oct. 9, 1979 [JP] Japan .................................. 54-130152

[51] Int. Cl.³ .............................................. G05B 5/01
[52] U.S. Cl. .................................... 318/611; 318/561
[58] Field of Search ............... 318/561, 571, 611, 612, 318/613, 653; 364/474, 475

[56] References Cited

U.S. PATENT DOCUMENTS

| | | | |
|---|---|---|---|
| 3,995,208 | 11/1976 | Parr | 318/611 X |
| 4,206,392 | 6/1980 | Shimajiri et al. | 318/596 X |
| 4,207,504 | 6/1980 | Kawada et al. | 318/616 |
| 4,216,422 | 8/1980 | Divjak | 318/612 |
| 4,219,765 | 8/1980 | Morsing | 318/616 X |

*Primary Examiner*—B. Dobeck
*Attorney, Agent, or Firm*—Staas & Halsey

[57] ABSTRACT

A system for controlling the rotation of a spindle which includes motor, a speed detector for detecting the speed of the motor and for producing a signal indicative of the actual speed thereof, a speed control circuit for controlling the motor so as to narrow a deviation between the signal indicative of the actual motor speed and a command speed signal, a spindle which is driven by the motor, and an orientation control circuit for producing a position deviation signal on the basis of the rotational position of the spindle and a commanded stopping position, wherein the spindle is rotated at a commanded speed by the speed control circuit and rotationally controlled in response to an orientation command signal so as to reduce the position deviation signal to zero. The gain of the speed control circuit is raised upon detecting that the rotational position of the spindle has reached the vicinity of the commanded stopping position, whereby the spindle which comes to rest at the commanded stopping position is held at such position rigidly as if secured there by a mechanical brake. Hence the spindle will not rotate accidentally even if subjected to an external force.

9 Claims, 9 Drawing Figures

SPINDLE ROTATION CONTROL SYSTEM

BACKGROUND OF THE INVENTION

This invention relates to a system for controlling the rotation of a spindle, and more particularly to a spindle rotation control system which is adapted to rotate the spindle of a machine tool at a commanded speed, to stop the spindle at a commanded position with a high accuracy, and to increase the rigidity at which the spindle is held when at rest.

Some machine tools which are known in the art have an automatic tool changing function that allows machining to be performed automatically while a variety of tools are changed automatically. The tool changing operation proceeds as follows. First, a magazine holding a number of tools is revolved to bring a vacant tool holding portion of the magazine into position directly above a spindle mechanism. The spindle mechanism, which is grasping an old tool to be exchanged for a new one, is then projected forwardly, after which the magazine positioned above the spindle mechanism is lowered to permit the old tool to be received and grasped by the vacant tool holding portion of the magazine. The spindle mechanism is then retracted so that the old tool separates from the spindle, thus transferring the old tool to the magazine. Next, the magazine is reolved to bring a desired new tool into position in front of the spindle, and the spindle mechanism is projected forwardly to receive and grasp the new tool. Finally the magazine is raised away from the spindle to complete the tool change operation.

It is required in the tool change mechanism of the foregoing type that the fitting portions of the spindle and a tool be mated accurately during the changing of tools. In other words, if a specified point on the spindle is not stopped accurately at a predetermined rotational position, the tool changing operation cannot proceed smoothly. To this end, machine tools having the conventional automatic tool change function are provided with a photoelectric detector or with a limit switch mechanism for detecting the position of a key on the spindle. The arrangement is such that the spindle is brought to a stop at the predetermined rotational position by the application of a mechanical brake which is actuated in response to a signal from the detecting means. Then, with the spindle stopped at the predetermined position, a pin projecting from the spindle is engaged with a keyway to fix and position the spindle accurately. Since this method makes use of the mechanical pin mechanism, however, the operator may accidentally apply an excessive force to the pin and cause it to bend. In such a case it would be impossible to stop the spindle at the predetermined rotational position, thereby giving rise to an occasion where the changing of tools could not be performed smoothly. Avoiding this situation usually entails troublesome maintenance and inspection work as well as the frequent replacement of the pin.

Figure 1:
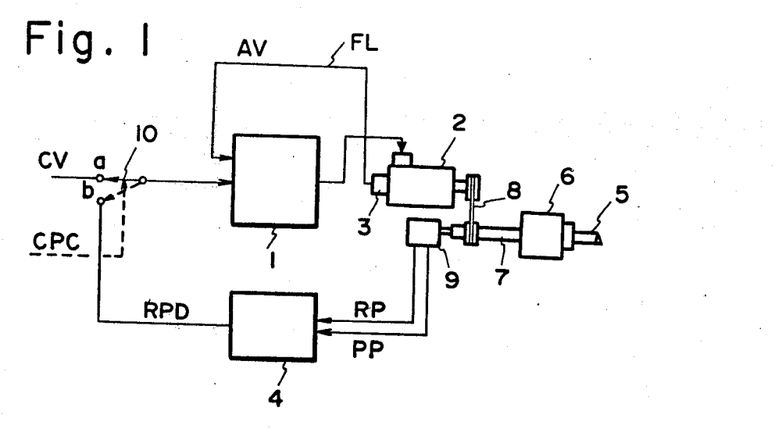
FIG. 1 is a block diagram of a servo system employed in controlling the rotation of a spindle in accordance with a previous proposal.
Figure 2:
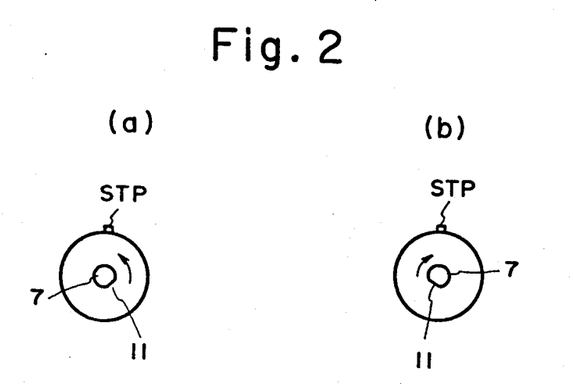
FIG. 2 is an illustrative view useful in explaining the operation of the servo system of FIG. 1.
Figure 3:
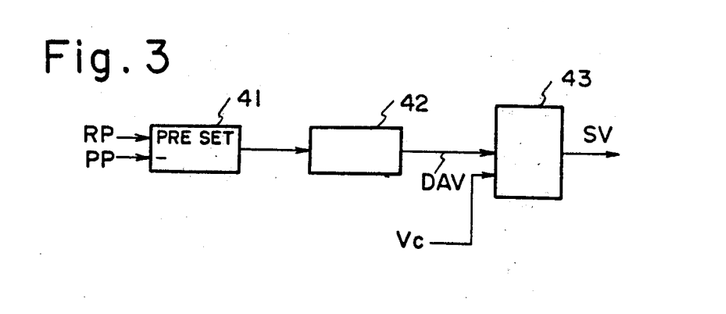
FIG. 3 is a block diagram of a circuit for generating a position deviation signal.
Figure 4:
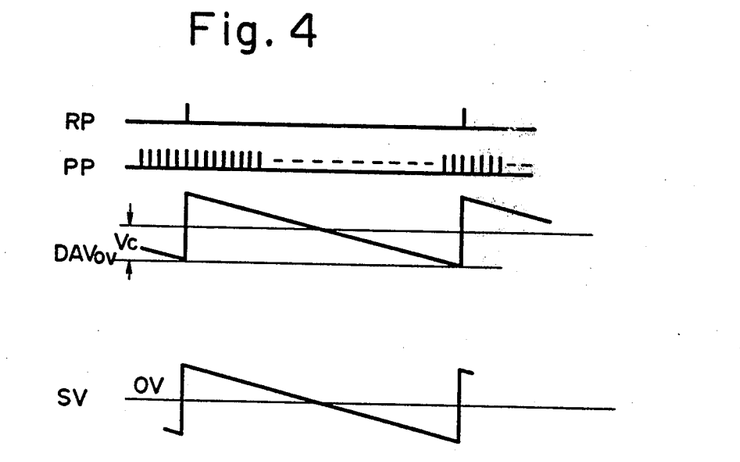
FIG. 4 is a waveform diagram of signals associated with the diagram of FIG. 3.

The present inventors have already proposed a spindle rotation control system which enables a spindle to be stopped at a predetermined rotational position with a high accuracy without the use of a mechanical brake or mechanical stopping mechanism, and which permits the spindle to be rotated at a commanded speed. The previously proposed system is illustrated in FIGS. 1 through 4. FIG. 1 shows a block diagram of a servo system employed in controlling spindle rotation, FIG. 2 is an illustrative view useful in explaining the operation of the servo system, FIG. 3 is a block diagram of a circuit for generating a position deviation signal, and FIG. 4 is a waveform diagram of signals associated with the circuit of FIG. 3.

Referring to FIGS. 1 and 2, there is provided a speed control circuit 1, a DC motor 2, a tachometer generator 3 for generating a voltage in accordance with the speed of the DC motor 2, and an orientation control circuit 4 for producing a voltage in accordance with a deviation between a commanded stopping position and the actual position of a spindle. Numeral 5 denotes a tool, 6 a spindle mechanism on which the tool is mounted, and 7 a spindle which is coupled to the DC motor 2 via a belt 8 (or gears). A rotational position detector 9, such as a resolver or a position coder which is adapted to generate a pulse whenever the spindle rotates by a predetermined angle, is connected directly to the spindle 7 for producing a signal in accordance with the rotational position of the spindle. In the arrangement described hereinafter, the rotational position detector adopted will be the position coder. Numeral 10 denotes a changeover switch. In FIG. 2, an orientation portion 11 must be located at a predetermined rotational position in order for a tool to be changed smoothly.

The movable contact of the changeover switch 10 (FIG. 1) is connected to the side a when the tool 5 performs a machining operation, so that the speed control circuit 1 receives a command speed signal CV, from a command speed signal generating circuit (not shown). The speed control circuit 1 also receives from the tachometer generator 3 an analog actual speed signal AV of a voltage level which is in accordance with the actual speed of the DC motor 2 as measured by the tachometer. The speed control circuit 1 is operable to produce an analog voltage in accordance with the deviation between the command speed signal CV and the actual speed signal AV, and to apply this analog voltage to the DC motor 2 to regulate its speed to the command speed. Thus, the speed control circuit 1, DC motor 2, tachometer generator 3 and a feedback line FL form a speed control feedback loop which functions to regulate the DC motor as described. This arrangement is well known in the art and need not be described in more detail.

When the machining work is completed and the DC motor 2 is to be stopped, the command speed signal CV is switched over to a value such as zero volts, and the speed of the motor is reduced while applying an electrical brake thereto. Then, immediately before the motor comes to rest, namely at such time that the speed of the motor has reached a fairly low level, an orientation command signal CPC is applied to the changeover switch 10, so that the movable contact of the switch is changed over from the side a to the side b.

The orientation control circuit 4 is adapted to produce a position deviation signal RPD, which is an analog voltage, in accordance with the deviation between a commanded stopping position which has been predetermined, and the actual rotational position of the spindle.

Reference will be had to FIGS. 3 and 4 to describe the operation of the orientation control circuit 4 for a case in which there is but one stopping position for the orientation portion 11 on the spindle 7. The arrangement is such that the position coder 9 produces a single pulse RP for each revolution of the spindle, and pulses PP each one of which is produced whenever the spindle rotates by a predetermined angle, the position coder 9 generating a total of N pulses for each single revolution of the spindle 7. The position coder 9 is mounted on the spindle 7 in such a manner that it issues the one-revolution pulse RP at such time that the orientation portion 11 on the spindle has rotated 180° from the commanded stopping position STP, shown in FIG. 2. A counter 41 shown in FIG. 3 is set to the numerical value N upon the generation of the pulse RP, and then has this preset value decremented by each pulse PP that subsequently arrives from the position order. A digital-to-analog converter (referred to as a DA converter hereinafter) 42 converts the output of the counter 41 into an analog voltage DAV which is applied to an analog subtractor 43, the latter producing a difference voltage SV between the analog voltage DAV and a constant voltage Vc. Accordingly, if the voltage Vc is set to ½ the peak value of the analog voltage DAV from the DA converter, the difference voltage SV will have a sawtooth waveform that crosses the zero level at such time that 180° is covered by the spindle from the generation of the pulse RP, as shown in FIG. 4. Since the commanded stopping position of the spindle is displaced by exactly 180° from the point at which the pulse RP is generated, as described above, the orientation portion 11 on the spindle reaches the commanded stopping position at the moment the difference voltage SV crosses the zero level. It should be noted that the difference voltage SV is proportional to the position deviation signal RPD (FIG. 1).

Therefore when the changeover switch 10 in FIG. 1 is changed over to the b side, the speed control circuit 1 delivers a difference voltage between the position deviation signal RPD and the actual speed signal AV, whereby positional servo control is executed to make the position deviation signal RPD zero. Thus, the speed control circuit 1, DC motor 2, spindle 7, position coder 9, orientation control circuit 4 and changeover switch 10 form a position control feedback loop. If the orientation portion 11 on the spindle 7 is oriented as shown in FIG. 2(a), the spindle 7 will rotate counterclockwise and the orientation portion 11 will stop correctly at the commanded stopping position STP. Similarly, if the orientation portion 11 is oriented as shown in FIG. 2(b), the spindle will rotate clockwise and the orientation portion will stop correctly at the commanded stopping position.

Thus the previously proposed system rotates the spindle correctly at the commanded speed during rotation, and stops the spindle at the commanded stopping position when the spindle is to be stopped.

The DC motor employed in the above system to drive the spindle has a large inertia, so that it is necessary to reduce the gain of the speed control loop in view of system stability, that is, in order to preclude spindle overshoot and hunting. In other words, since this inertia is 5 to 20 times that of a DC motor employed in a feed servo system in which steady-state deviation and follow-up deviation pose problems, the gain of the spindle speed control loop is considerably low as compared to the gain of the feed servo system. This means that the spindle remains at rest with little rigidity and is likely to be turned by an externally applied force, such as may result from contact with the operator, or is likely to be rotated along with the motor if the latter is subjected to a mechanically eccentric load. This alters the rotational position at which the spindle is stopped and prevents tools from being changed smoothly. Furthermore, if the spindle orientation control circuit is applied to an apparatus such as a turning center that has a spindle indexing function, the spindle is likely to move during a cutting operation owing to the low rigidity of the spindle. This makes it impossible to machine a workpiece accurately. It is conventional practice, therefore, to make use of mechanical means such as a pin to prevent spindle rotation, but this complicates both the operating procedure and the mechanism itself.

SUMMARY OF THE INVENTION

Accordingly, it is an object of the present invention to provide a spindle rotation control system which will not allow a spindle of a machine tool to be rotated by an externally applied force when the spindle is at rest at a predetermined rotational position owing to the application of an electrical brake.

It is another object of the present invention to provide a novel spindle rotation control system which reduces gain when the spindle is rotating but which increases the gain when the spindle is at rest in order to prevent the spindle from being easily rotated by an external force applied at such time, and which is further adapted to permit the spindle to be restored to the predetermined stopping position by the restoring force of a position control loop even if the spindle should happen to be rotationally displaced by a small degree owing to a large external force, and which allows the stability of the system to be maintained while the spindle is rotating.

Other features and advantages of the invention will be apparent from the following description taken in conjunction with the accompanying drawings.

DESCRIPTION OF THE PREFERRED EMBODIMENT

Figure 5:
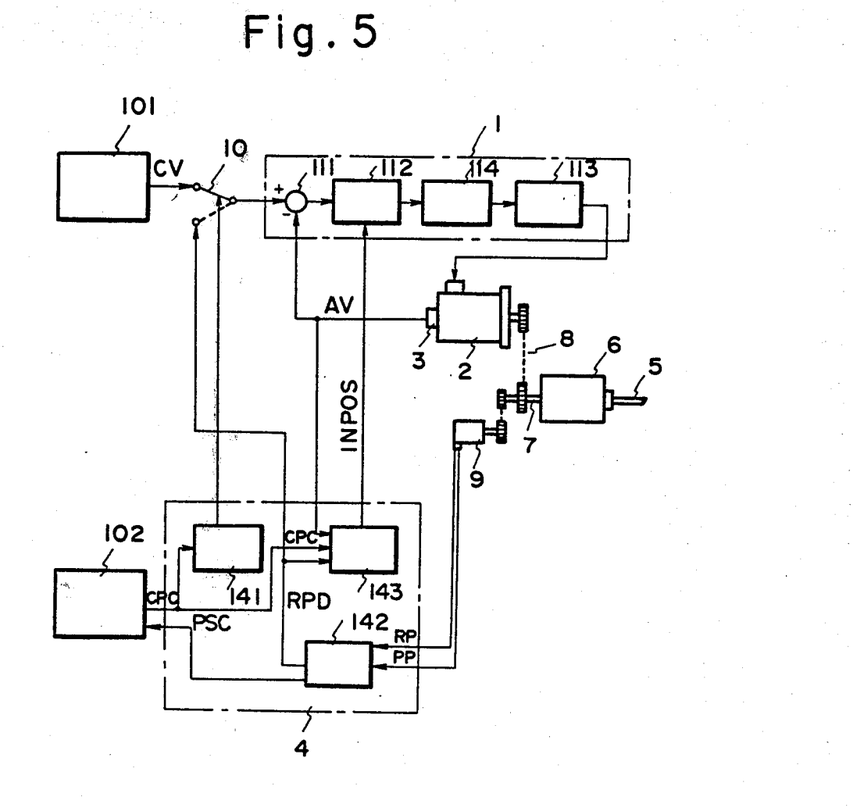
FIG. 5 is a circuit block diagram of a spindle rotation control loop which is useful in describing the spindle rotation control system according to the present invention.
Figure 6:
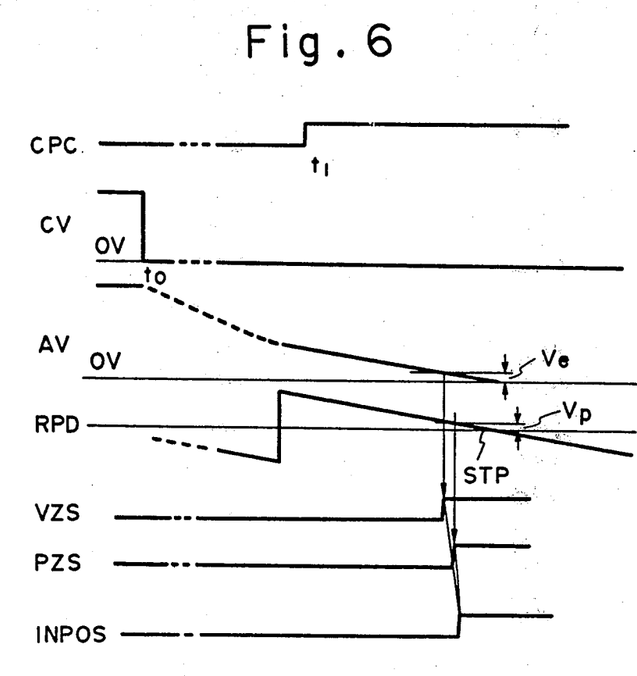
FIG. 6 is a waveform diagram of signals associated with the diagram of FIG. 5.

Referring now to FIGS. 5 and 6, and more particularly to FIG. 5 wherein like reference numerals designate parts which are identical to those shown in FIGS. 1 and 3, there are shown a speed command circuit 101 and an orientation command circuit 102, the former producing a speed command signal CV and the latter an orientation command signal CPC. The speed control circuit 1 includes an adder 111 which is adapted to deliver a difference voltage between the command speed signal CV and the actual speed signal AV from the tachometer 3, a well-known phase compensating circuit 112 which subjects the phase of the servo system to a phase compensation by advancing or retarding the phase, and a thyristor circuit 113 having a plurality of thyristors whose firing angles are controlled by a firing signal from a voltage-to-phase converting circuit which be described hereinafter, the thyristor circuit responding by regulating the voltage applied to the DC motor 2. It should be noted that this speed control system is known as a thyristor Leonard system. The speed control circuit 1 includes also a voltage-to-phase converting circuit 114 which controls the firing angle of each thyristor in the thyristor circuit 113 in accordance with the deviation between the command speed signal CV and the actual speed signal AV, the voltage applied to the DC motor 2 being increased when the deviation is large and decreased when the deviation is small, so that the speed of the DC motor is made to follow the commanded speed.

A loop changeover circuit 141 receives the orientation command signal CPC from the orientation command circuit 102 and switches the movable contact of the changeover switch 10. Numeral 142 denotes the deviation signal generating circuit shown in FIG. 3, the circuit being adapted to also generate an orientation completion signal PSC when the positioning of the spindle is complete. A circuit 143 generates an "in-position" signal INPOS when a specified point (the orientation portion 11) on the spindle 7 arrives at the vicinity of the command stopping position, the signal INPOS being fed to the phase compensating circuit 112 to switch over the gain. The loop changeover circuit 141, position deviation signal generating circuit 142 and the in-position signal generating circuit 143 form the orientation control circuit 4.

Reference will now be had to FIG. 6 to describe the operation of the present invention, that is, the positional control of the spindle. The control of spindle speed, namely the speed of the DC motor 2, is executed in exactly the same manner as with the conventional apparatus shown in FIG. 1.

When a machining operation is completed (time $t_0$), the speed command signal CV from the speed command circuit 101 decreases to zero volts, so that the actual speed signal AV of the DC motor 2 begins decreasing. The orientation command circuit 102 generates the orientation command signal CPC at a predetermined time $t_1$ which is immediately before the motor 2 comes to rest. It can be so arranged that the signal CPC is generated automatically a predetermined time after the production of the signal that stops the DC motor 2, or when the actual speed signal AV has dropped below a fixed level following the production of said signal. The generation of the orientation command signal CPC causes the loop changeover circuit 141 to switch the movable contact of the changeover switch 10 from the side a to the side b, thereby actuating the position control feedback loop. The adder 111 now produces the difference voltage between the position deviation signal RPD from the position deviation signal generating circuit 142 and the actual speed signal AV from the tachometer generator 3. This difference voltage is applied to the voltage-to-phase converting circuit 114 through the phase compensating circuit 112. The circuit 114 controls the firing angle of each thyristor in the thyristor circuit 113 in accordance with the value and polarity of the difference voltage, thereby varying the voltage which is applied to the DC motor 2. As a result, the speed of the DC motor 2 is reduced further so as to narrow the difference voltage to zero. Meanwhile the orientation command signal CPC, the actual speed signal AV and the position deviation signal RPD are also being applied to the in-position signal generating circuit 143. The circuit 143 is adapted to generate the in-position signal INPOS when the orientation command signal CPC, and signals VZS and PZS, described below, are at logical "1" simultaneously. The signal VZS, formed within the circuit 143, goes to logical "1" when the actual speed signal AV falls to a value of substantially zero, that is, when it reaches a low level Ve. The signal PZS, also formed within the circuit 143, goes to logical "1" when the position deviation signal RPD drops below a predetermined level Vp. Thus, when the three signals CPC, VZS, PZS attain the high level, the output of an AND gate which is included in the circuit 143 and which receives the three signals, goes to logical "1", thereby giving rise to the in-position signal INPOS. This signal is applied to the phase compensating circuit 112 whose gain rises two to threefold as a result. It is preferred that the in-position signal INPOS be generated when the specified point on the spindle is within a range of from ±3° to ±5° with respect to the predetermined stopping position. After the generation of the signal INPOS, the position control feedback loop operates to stop the specified point, (such as the orientation portion 11 in FIG. 2) on the spindle, at the stopping position in an accurate manner.

The phase compensating circuit 112 has a well-known design and has not been described in detail. The changeover in gain mentioned above can be accomplished with facility by switching resistance values or by a similar expedient. Moreover, while the case described above deals with raising solely the gain of the phase compensating circuit 112, this is not particularly restrictive. It would suffice equally well to vary the gain of an amplifier in any one of the circuits. What is important is that arrangement be capable of raising the gain of the feedback loop.

Figure 7:
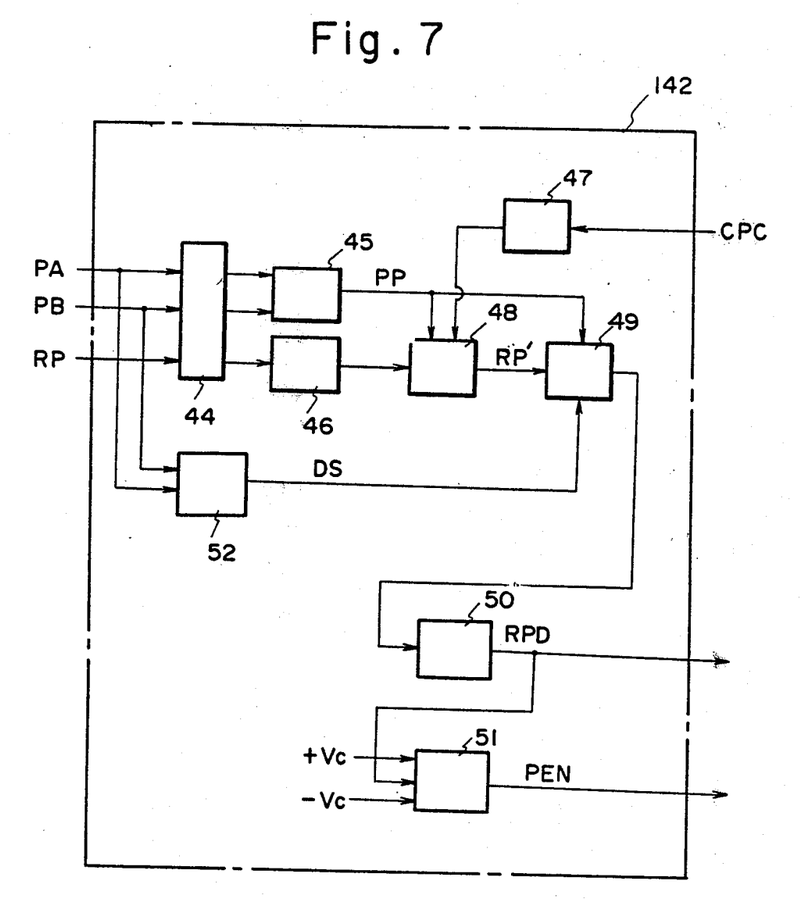
FIG. 7 is a block diagram of another embodiment of a circuit for generating a position deviation signal.
Figure 8:
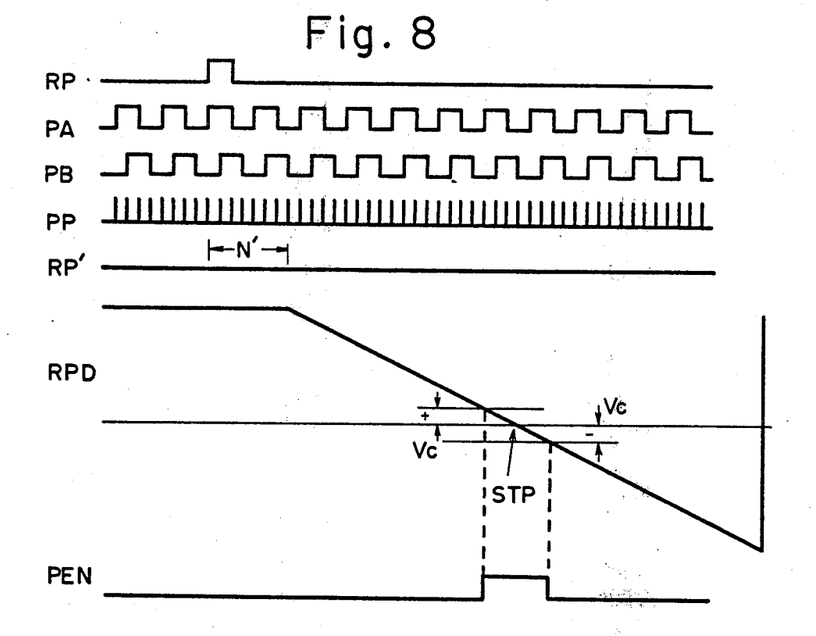
FIG. 8 is a waveform diagram of signals associated with the diagram of FIG. 7.

The present invention also is not restricted to the structure of the position deviation signal generating circuit 142 as shown in FIG. 3. Another embodiment of the circuit, wherein a position coder is employed as the position detector, is illustrated in FIG. 7. The associated waveform are shown in FIG. 8. In FIG. 7, a line receiver 44 receives from the position coder 9 position pulses PA, PB, each one of which is produced whenever the spindle rotates by a predetermined angle, and a single revolution pulse RP which is produced for each revolution of the spindle. The position pulse trains PA, PB are displaced from each other by a phase of $\pi/2$. A quadrupling circuit 45 differentiates the position pulses PA, PB and produces pulses PP that coincide with the positive- and negative- going transitions of the pulses PA, PB, the result being a pulse train having a frequency which is four times that of the PA, PB pulse trains, respectively. A circuit 46 detects the single revolution pulse RP. A stopping position setting switch 47 is closed by the orientation command CPC, and a stopping position setting circuit 48 issues a pulse RP'. More specifically, if the single revolution pulse RP is generated while the stopping position setting switch 47 is closed, the circuit 48 issues the pulse RP' after N'-number of pulses PP have been produced following the generation of the pulse RP. The orientation portion 11 in FIG. 2 is opposite the commanded stopping position STP at the instant the pulse RP' is generated. In other words, at this instant the orientation portion 11 is displaced by 180° from the position STP. A presettable reversible counter 49 is preset to a value of M/2 by the pulse RP', where M is the number of pulses PP that are generated for one revolution of the spindle. After the counter 49 has been preset, the content of the counter is incremented or decremented by each generated pulse PP in accordance with the rotational direction of the spindle. A digital-to-analog converter (referred to a DA converter hereinafter) 50 is supplied with the content of the counter, namely with the sign and numerical value of the count, and converts the numerical value into an analog signal which is issued as the position deviation signal RPD whose polarity depends upon the sign of the received numerical value. A slicing circuit 51 compares the position deviation signal RPD with constant voltages $+Vc$ and $-Vc$, and generates an orientation completion signal PEN when the signal RPD lies between the two levels $+Vc$, $-Vc$. A direction discrimination circuit 52 monitors the phases of the position signals PA, PB to discriminate the direction of spindle rotation and send a direction signal DS to the reversible counter 49. The direction discrimination is based upon the fact that the position pulses PA will lead the position pulses PB in phase when the spindle is rotating in the forward direction, and will lag behind the position pulses PB when the spindle is rotating in the reverse direction. Thus the position deviation signal RPD issued from the DA converter 50, and shown in FIG. 8, is in accordance with the rotational position of the spindle. This signal is applied to the speed control circuit 1, shown in FIG. 5, through the changeover switch 10, after which the position control operation is executed as described above. It can be appreciated that the position deviation signal generator embodied in FIG. 7 makes possible orientation control of much a higher precision in comparison with the arrangement of FIG. 3.

Figure 9:
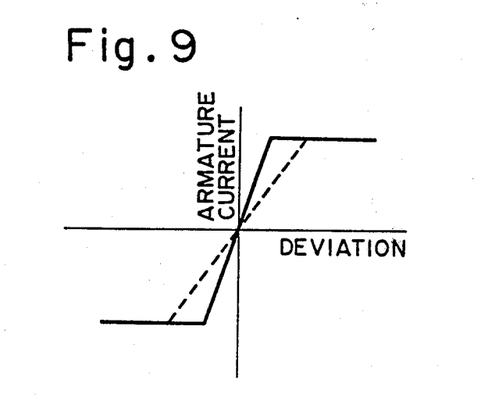
FIG. 9 is a graph of an armature current-speed deviation characteristic.

The graph of FIG. 9 shows the armature current-deviation (output of the adder 111) characteristic of the position control loop, with the armature current plotted along the vertical axis and the deviation along the horizontal axis. The solid line indicates the case for a high gain, and the dotted line the case for low gain. From this it can be understood that increasing the gain provides a much greater armature current at the same deviation. And since rotational torque is proportional to armature current, the higher the gain, the greater the torque (restoring force) and hence, the higher the rigidity at which the spindle is held when at rest.

In accordance with the present invention as described above, lowering the gain during rotation allows the stability of the system to be enhanced, while raising the gain when the spindle is at rest enables the rigidity of the system to be increased. Therefore the spindle will not rotate easily when subjected to an external force, and can be returned to the commanded stopping position even if the spindle should happen to be displaced slightly by an extremely large external force. The gain can be switched over by means of a very simple circuit arrangement and therefore does not raise the cost of the system. The mechanical operability of the system also is greatly enhanced since it is not necessary to insert a key or the like to secure the spindle against rotation.

While the present invention has been described and illustrated in connection with just one stopping position, it can be adapted to stop a spindle at a plurality of such positions located at 0°, 90°, 180°, 270°, etc. In such case, however, the orientation command circuit 102 would have to be adapted to issue commands indicating the particular stopping position, and the orientation control circuit 4 would have to be modified to generate a position deviation signal RPD in accordance with each of the possible stopping positions.

Although the present invention has been described in its preferred form with a certain degree of particularity, it is obvious that many modification and variations are possible in the light of the above teachings. It is therefore to be understood that within the scope of the a pended claims, the invention may be practiced otherwise than as specifically described.

What we claim is:

1. A system for receiving an orientation command signal, and for controlling the rotation of a spindle which comprises:
   a motor having a variable speed;
   speed detecting means for detecting the speed of said motor and for producing a signal indicative of the actual speed thereof;
   a speed control circuit having a variable gain, operatively connected to the speed detecting means and to the motor, for controlling said motor so as to narrow to zero a deviation between the signal indicative of the actual speed thereof and a command speed signal, and for outputting a signal representing said deviation;
   a spindle driven by said motor which is rotated at a commanded speed in accordance with the output of said speed control circuit;
   an orientation control circuit, operatively connected to the speed detecting means and to the motor, for producing a position deviation signal on the basis of the rotational position of said spindle and a commanded stopping position;
   changeover means for applying one of the position deviation signal produced by said orientation control circuit and the command speed signal to said speed control circuit in response to said orientation command signal, so that the rotation of said motor, and hence said spindle, is controlled so as to reduce to zero the position deviation signal; and
   means for raising the gain of said speed control circuit upon detecting that the rotational position of said spindle has reached a position in the vicinity of the commanded stopping position.

2. The system according to claim 1, further comprising a position coder, operatively connected to said spindle, for generating a one-revolution pulse whenever said spindle makes one revolution, and for generating N position pulses for each revolution of said spindle, and wherein said orientation control circuit includes:
   a counter operatively connected to said position coder, which is preset to the numerical value N of said position pulses by the one-revolution pulse and whose content is counted down by each generated position pulse,
   a digital-to-analog converter operatively connected to said counter, for converting the content of said counter into an analog signal voltage, and
   a subtracting circuit operatively connected to said digital-to-analog converter, for subtracting a fixed voltage value from the output voltage of said digital-to-analog converter, the output of said subtracting circuit corresponding to the position deviation signal.

3. The system according to claim 1, further comprising a position coder mounted on said spindle for generating a one-revolution pulse whenever said spindle makes one revolution, and for generating a plurality of position pulses for each revolution of said spindle, and wherein said orientation control circuit includes:
- a stopping position setting circuit operatively connected to said position coder, for receiving said plurality of position pulses and for generating a delayed one-revolution pulse in accordance with said one-revolution pulse and a numerical value N' of position pulses,
- a reversible counter operatively connected to said stopping position setting circuit, which is set to a numerical value M corresponding to a predetermined angle of spindle rotation when position pulses in accordance with the numerical value N' have been generated following the generation of the one-revolution pulse, the content of said reversible counter being counted up or counted down by each arriving position pulse in accordance with the direction of rotation of said spindle, and
- a digital-to-analog converter operatively connected to said reversible counter, for converting the content of said reversible counter into an analog signal voltage, the stopping position of said spindle being changed by the numerical value N' set in said stopping position setting circuit, and the output of said digital-to-analog converter serving as the position deviation signal.

4. The system according to claim 3, in which said predetermined angle is set to 180°.

5. The system according to claim 1, wherein said changeover means includes:
- a changeover switch provided on the input side of said speed control circuit, for receiving said command speed signal and said position deviation signal, and
- a loop changeover circuit operatively connected to said changeover switch for receiving said orientation command signal and for switching over said changeover switch to apply the position deviation signal to said speed control circuit when said spindle is at rest and at the commanded stopping position.

6. The system according to claim 1, claim 2 or claim 3, wherein said orientation control circuit includes:
- a first circuit operatively connected to said speed detecting means, for detecting that the signal indicative of the actual speed of the spindle has dropped below a first fixed level, and
- a second circuit operatively connected to said first circuit, for receiving said position deviation signal, for receiving said orientation command signal, and for detecting that the position deviation signal has fallen below a second fixed level, said orientation control circuit generating an in-position signal by taking the logical AND of a detection signal from said first circuit, a detection signal from said second circuit, and the orientation command signal, and
- wherein said in-position signal is applied to said speed control circuit to raise the gain thereof.

7. The system according to claim 6, in which said speed control circuit includes a phase compensating circuit operatively connected to said change means and to said orientation control circuit, for generating a signal responsive to said in-position signal.

8. A system according to claim 3, wherein said stopping position setting circuit further comprises a position counter operatively connected to said position coder for counting said N' position pulses in response to said one-revolution pulse and for providing said delayed one-revolution pulse in response to counting said N' position pulses, and
said reversible counter counts said M position pulses in response to said delayed one-revolution pulse.

9. The system according to claim 3 or 8, further comprising a direction detecting circuit, operatively connected to said position coder and to said reversible counter, for determining the direction of rotation of said spindle and controlling the counting direction of said reversible counter in accordance with said plurality of position pulses.

* * * * *

UNITED STATES PATENT AND TRADEMARK OFFICE
CERTIFICATE OF CORRECTION

PATENT NO. : 4,342,950
DATED : August 3, 1982
INVENTOR(S) : Kohzai et al.

It is certified that error appears in the above—identified patent and that said Letters Patent is hereby corrected as shown below:

Col. 1, line 27, "reolved" should be --revolved--.

Col. 5, line 7, "circuit which" should be --circuit 114 which will--.

Col. 6, line 47, "waveform" should be --waveforms--.

Col. 7, line 10, after "referred to" insert --as--;

line 37, "much a" should be --a much--.

Col. 8, line 9, "modification" should be --modifications--;

line 11, "a" should be --ap- --.

Signed and Sealed this

Eighteenth Day of January 1983

[SEAL]

Attest:

GERALD J. MOSSINGHOFF

Attesting Officer    Commissioner of Patents and Trademarks